G. W. Blake,
Belt Fastener.

Nº 28,033.      Patented Apr. 24, 1860.

Witnesses.
R. S. Spencer
J. W. Coombs

Inventor
G. W. Blake
per Munn
Attorneys

UNITED STATES PATENT OFFICE.

G. W. BLAKE, OF PEPPERELL, MASSACHUSETTS, ASSIGNOR TO HIMSELF AND L. W. BLAKE, OF SAME PLACE.

BELT-FASTENING.

Specification forming part of Letters Patent No. 28,033, dated April 24, 1860; Reissued August 4, 1868, No. 3,064.

*To all whom it may concern:*

Be it known that I, G. W. BLAKE, of Pepperell, in the county of Middlesex and State of Massachusetts, have invented a new and Improved Belt-Fastening; and I do hereby declare that the following is a full, clear, and exact description of the same, reference being had to the accompanying drawing, forming a part of this specification, in which—

Figure 1:
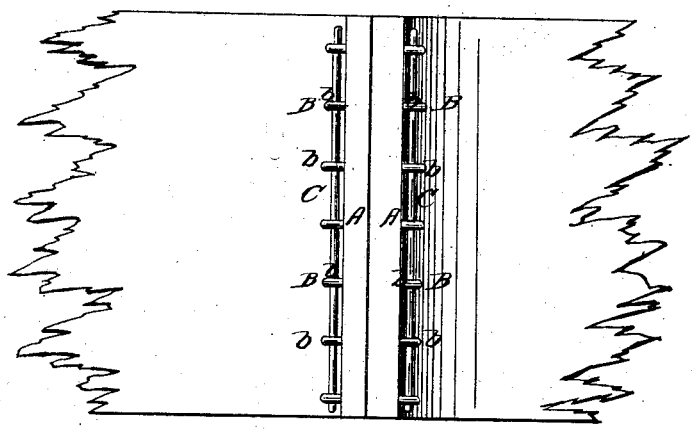
Figure 2:

Figure 1, represents a plan or top view of my invention; Fig. 2, a longitudinal vertical section of ditto.

Similar letters of reference in both views indicate corresponding parts.

This invention consists in the employment of two-eyed loops or links which are passed through suitable slits cut at certain distances into the ends of the belt, in combination with rods which pass through the several eyes or links on both ends and extending across the whole width of the belt, so as to fasten the two ends together, without creating any elevation or bulging out on the inside of the belt, thereby enabling the same to run perfectly smooth and even.

To enable those skilled in the art to make and use my invention, I will proceed to describe it with reference to the drawing.

A, A, are the two ends of a belt of leather or any other material commonly used for driving machinery. In order to enable the belt to run even and smooth over the pulleys on which it is stretched, it is necessary that its inner side is left perfectly smooth and without any elevation or bulge, which would cause the same to jump. To effect this purpose I use loops B, which pass through slits *a*, cut into both ends of the belt at suitable distances one from the other. The loops are furnished with two eyes *b*, each, and said eyes are at such distances apart, that when the loops are passed through both ends of the belt, the eyes extend far enough on each side to admit rods C, which extend over the full width of the belt. These rods prevent the loops slipping out, and the belt can be subjected to a heavy strain until its ends are torn asunder. Comparatively thin iron wire, say No. 15 or 16, of the common wire gage is sufficiently strong to enable the belt to sustain a weight of nearly 400 pounds per inch of its width, and the inside of the belt is left perfectly flat, and without the least elevation which would cause an uneven running of the same.

Instead of using two-eyed loops B, for fastening the belt, simple links might be used, long enough to pass through both ends of the belt, and to admit the rods C, but I prefer loops such as represented in Fig. 2, in the drawing, as the same can be made cheap and they adapt themselves readily to the surface of the pulleys over which the belt has to run. The rods C, may also be made in several sections.

My belt-fastener is equally applicable to large and to small belts, and its cheapness and the facility with which the ends of the belt can be secured together, recommends it to the public.

Having thus fully described my invention, what I claim as new and desire to secure by Letters Patent, is—

The employment of two-eyed loops or links B, in combination with rods C, substantially as, and for the purpose described.

G. W. BLAKE.

Witnesses:
 HENRY BLAKE,
 SUMNER CARTER.